United States Patent [19]

Prater

[11] 4,154,493
[45] May 15, 1979

[54] ELECTRICAL APPARATUS HOUSING ASSEMBLY

[75] Inventor: Earle F. Prater, Long Beach, Calif.

[73] Assignee: The Birtcher Corporation, Los Angeles, Calif.

[21] Appl. No.: 875,137

[22] Filed: Feb. 6, 1978

[51] Int. Cl.² .............................................. B65D 7/00
[52] U.S. Cl. ..................... 312/257 R; 312/257 SK; 312/264; 312/108
[58] Field of Search ........ 312/257 R, 257 SK, 257 A, 312/257 SM, 140, 330, 320, 264, 265, 107, 198, 108; 52/281, 282

[56] References Cited

U.S. PATENT DOCUMENTS

| 2,730,421 | 1/1956  | Burst et al. ................... 312/257 A |
| 3,056,639 | 10/1962 | Caminker et al. ............. 312/257 SK |
| 3,297,383 | 1/1967  | Fay ................................. 312/257 R |
| 3,307,894 | 3/1967  | Collier ........................... 312/257 R |
| 3,413,050 | 11/1968 | Sommers et al. .................... 312/264 |
| 3,497,279 | 2/1970  | Chovance ........................... 312/108 |
| 3,506,322 | 4/1970  | Richards ............................ 312/108 |
| 3,563,627 | 2/1971  | Whipps .......................... 312/257 R |
| 3,623,784 | 11/1971 | Neufeld ........................ 312/257 SM |
| 4,077,686 | 3/1978  | Bukaitz ......................... 312/257 SK |
| 4,078,847 | 3/1978  | Presnick ........................... 312/140 |

*Primary Examiner*—Victor N. Sakran
*Attorney, Agent, or Firm*—Harold L. Jackson; Stanley R. Jones; Joseph W. Price

[57] ABSTRACT

An electrical apparatus housing assembly unit is constructed from mounting columns, a top and bottom panel member and two side panel members. The mounting columns serve as structural components of the electrical housing assembly unit and also as members to which electrical components and the like may be removably mounted. Additional component parts such as facias and spacers may also be mounted to the mounting columns. The facias and spacers, in addition to aesthetic value, provide additional strength to the electrical apparatus housing assembly.

1 Claim, 3 Drawing Figures

U.S. Patent May 15, 1979 4,154,493
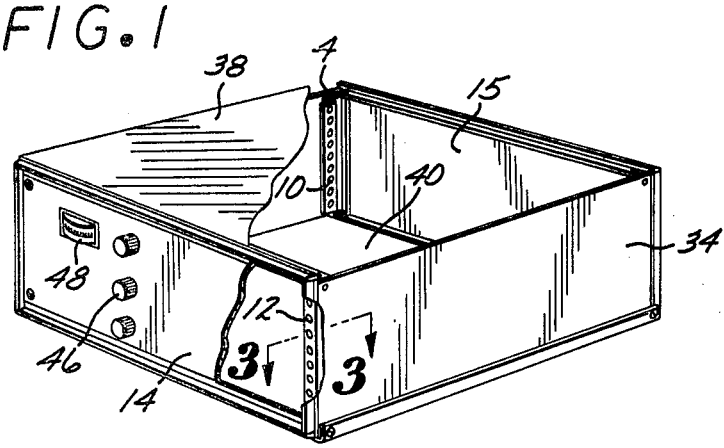
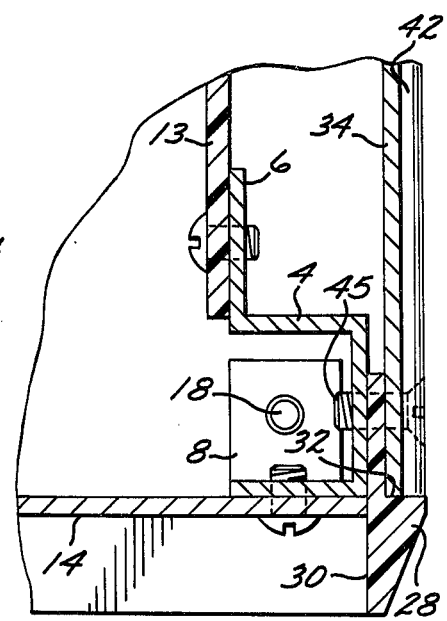
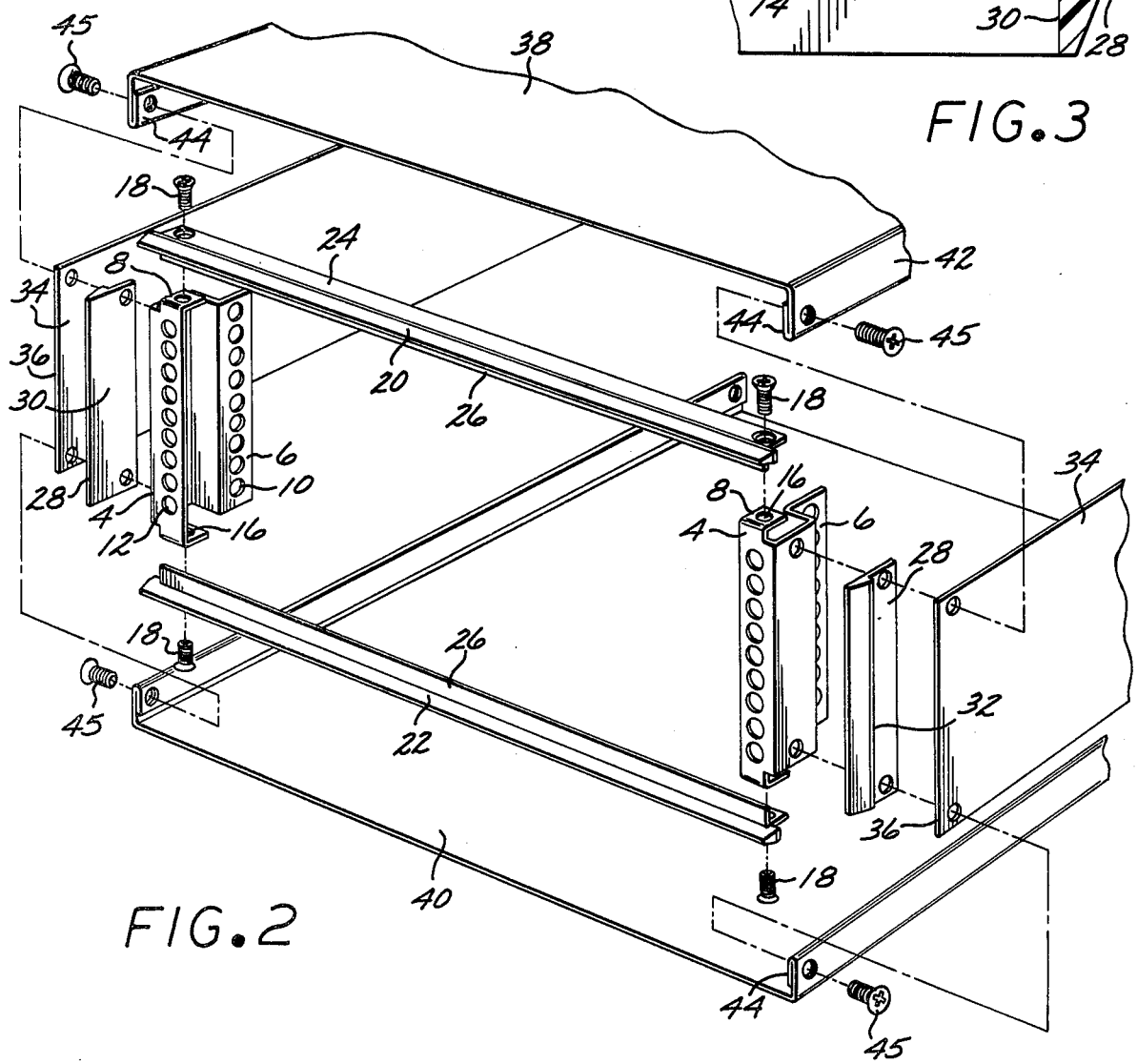

ELECTRICAL APPARATUS HOUSING ASSEMBLY

BACKGROUND OF THE INVENTION

1. Field of the Invention

The present invention is directed to a housing assembly for the housing of electrical components and the like, and more particularly to a housing assembly for electrical components and the like which is easily assembled on a commercial production line.

2. Description of the Prior Art

The electronics industry frequently utilizes prefabricated enclosures for the housing of various electrical components. Such enclosures generally take the shape of a box with the front or back panel or both missing, whereby a space enclosed from 4 or 5 sides is created. Such housing assembly units usually provide for the removable mounting of electrical components inside. The electrical housing assembly units are customarily sold unassembled and require assembly of the component parts of the unit by its user.

As can be readily appreciated, the cost of manufacturing of the component parts of such housing units, as well as the ease of assembly of the component parts into the housing units is of paramount economic and practical significance.

It is readily apparent that the less component parts and the less number of steps required for assembly, the more economical and practical is the electrical apparatus housing assembly unit.

In the present state of the art, the housing assembly units usually contain, in addition to the parts required to construct an enclosure, also a number of components ultimately utilized for the removable mounting of electrical components and the like inside the assembled housing unit. Such components usually comprise columns having a multiplicity of apertures. The columns are usually fastened to the inside walls of the housing assembly, and the apertures in the columns serve for the removably mounting of electrical components. Alternatively some form of a racking device is fastened to the inside of the housing assembly unit thereby providing for the racking of printed circuits and the like shaped electronic components.

The prior art is still striving to fill the need for an electrical apparatus housing assembly unit which is inexpensive to manufacture and easy to assemble.

SUMMARY OF THE INVENTION

The present invention is directed to an electrical housing assembly unit adapted for removable mounting of articles inside.

One object of this invention is to simplify the manufacture of the component parts of the electrical housing unit.

Another object of this invention is to provide an electrical apparatus housing assembly unit which is easy to assemble from its component parts.

Still another object of this invention is to lower the cost of the electrical apparatus housing assembly unit.

The above stated objects are attained by a structure where a top and a bottom panel member and two side panel members are connected to mounting columns. The mounting columns in addition to providing the structural connection among the panel members, also are utilized for the removable mounting of electrical components and the like inside the assembled housing unit. The mounting columns also serve as structural support for any additional parts such as facias or spacers if those are desired in a specific embodiment of the invention.

The concept of utilizing the mounting columns for the mounting of articles such as electrical components as well as for the structural assembly of the housing unit results in an improved, inexpensive and readily assembled housing unit.

The features of the present invention which are believed to be novel can be best understood, together with further objects and advantages, by reference to the following description, taken in connection with the accompanying drawings.

BRIEF DESCRIPTION OF THE DRAWINGS

FIG. 1 is a front perspective view of a specific embodiment of the present invention, with part of the top and front panel broken away;

FIG. 2 is an exploded front perspective view of a specific embodiment of the present invention; and FIG. 3 is a cross sectional view of the lower right corner of a specific embodiment of the present invention, taken in the direction of arrow 3—3 on FIG. 1.

DESCRIPTION OF THE PREFERRED EMBODIMENT

The following specifications taken in conjunction with the drawings set forth the preferred embodiment of the present invention in such a manner that any person skilled in the electrical housing assembly arts can use the invention. The embodiments of the invention disclosed herein are the best modes contemplated by the inventor for carrying out his invention in a commercial environment, though it should be understood that various modifications can be accomplished within the parameters of the present invention.

Referring to the perspective view of FIG. 2, the structural parts and the mode of assembly are disclosed for one specific embodiment of the present invention. Mounting columns 4, which in this specific embodiment of the invention are all identical, have a central U shaped cross section and a flange or lip portion 6 which protrudes at a 90° angle from the main body of the mounting column 4. Each end of the mounting column is closed with a cantilevered mounting tab 8. The mounting columns 4 are provided with a plurality of apertures 10 in the lip portion 6, and also in the main body portion 12. The relative position of lip portion 6 and cantilevered tab 8 are best seen in the cross sectional view of FIG. 3.

It is readily apparent to those ordinarily skilled in the mechanical arts that the above described mounting columns 4 of this specific embodiment of the present invention can be manufactured by sheet metal stamping, though the invention is in no way intended to be limited to that mode of manufacture.

It should be noted that because all the mounting columns of the specific embodiment of the present invention as shown in FIGS. 1, 2 and 3 are idential, they all can be manufactured by the same machinery thus providing an economic advantage.

Referring back to FIGS. 2 and 3 the apertures 10 in the lip portion 6 of mounting columns 2 are in the form of round holes and can be used for mounting electric components inside the assembled housing unit such as a printed circuit board rack 13. The apertures 12, in the main body of the mounting columns, also in the form of round holes, can be used for the attachment of a front panel 14 and a back panel 15 as shown on FIG. 1. Furthermore the apertures 12 can also be used, as apertures 10, for the removable mounting of electronic components. It is to be understood that while the preferred embodiment of the invention utilizes apertures, the invention is not intended to be limited thereto, as other suitable means for mounting of the electrical components could also be used.

The cantilevered tabs, 8 on each end of the mounting columns 4 are provided with holes 16 for the receipt of fasteners. In this specific embodiment, screws 18 can be used for the fastening of facias 20 and 22 on the mounting columns 4.

Alternatively, in other preferred embodiments bolts and nuts may be used for fastening. Especially preferred is the use of nuts which tightly fit into the holes 16 and are held therein by small flanges engaging the surface surrounding the hole, and by the friction generated by the tight fit. Such nuts are commonly referred to as PEM nuts.

Top facia 20 as well as bottom facia 22 have a ledge 24, and a protruding portion 26. The front pair of mounting columns 4 are attached to the top and bottom facias 20 and 22 with the front side of the mounting columns 4 facing the front panel 14 and resting against the protruding portions 26 of the facias, the cantilevered tab portions 8 of the mounting columns 4 being directly underneath facia 20 and above the facia 22.

As further illustrated on FIGS. 2 and 3, spacers 28 having a planar side 30 and a triangular ledge 32 on the other side are positioned with their planar sides adjacent to those sides of the mounting columns 4 which face a side panel 34. The front edge 36 of the side panel abuts against the rear face of ledge 32 in each spacer 28. The facias 20 and 22 and the spacers 28 can be formed from anodized extruded brushed aluminum.

In the specific embodiment of the present invention shown here, the structural connection of the mounting columns 4, the facias 20 and 22, the spacers 28 and the side panels 34 are the same in the rear portion of the electrical apparatus housing assembly unit as in the front portion. It follows from the foregoing that all the mounting columns, the facias and the spacers are identical, thereby greatly simplifying their manufacture and hence their cost.

Furthermore as will be described immediately below and shown on FIGS. 1 and 2, a top panel member 38 and a bottom panel member 40 are also identical in the present invention, thereby further simplifying the manufacturing process and reducing cost.

The top panel member 38 and the bottom panel member 40 are identical in size and shape, and have a pair of side rails 42, which in this specific embodiment also contain parallel support portions or hems 44. The latter are designed to provide additional strength to the side rails 42 and hence to the whole assembled structure. However the invention is not intended to be limited by these parallel support portions or hems as the side rails can be readily designed to be sufficiently strong without the hems 44.

The side rails 42 of the top and bottom panel members 40 and 42 fit over the side panel members 34, while those edges of the top and bottom panel members 40 and 42 not having side rails rest against the ledges 24 of the front facias 20 and 22, as well as against the ledges 65 of the back facias so that the outer surfaces of the top and bottom panel members are flush with the facias. The top and bottom panel members 40 and 42 are fastened through their respective side rails to the mounting columns thereby securing the whole structure.

It is to be understood that while the specific embodiment of the present invention illustrated here utilizes screws for securing the structure, the scope of this invention is in no way intended to be limited to the use of screws, as other means of fastening such as bolts and PEM nuts are readily apparent to those ordinarily skilled in the mechanical arts.

As it is readily seen from the foregoing, the nature of the present invention and the design of the specific embodiment shown here, readily allows the use of interchangeable parts, for example the same mounting columns and spacers may be used for the construction of electrical apparatus housing assembly units of various length and width as long as the height of the units remains the same. This ability to use widely interchangeable components in units of various sizes tends to reduce the cost thereby attaining a stated objective of this invention.

As has been illustrated above, the assembly of the whole unit requires a few simple steps. The top and bottom facias 20 and 22 are placed above and below a pair of mounting columns 4 for the front end of the unit, and a spacer 28 is positioned next to each mounting column 4 on the side. The spacers 28 are temporarily held by the pressure of the facias 20 and 22. The facias 20 and 22 are then mechanically fastened to the mounting columns 4, the above steps are repeated with another pair of mounting columns 4, facias 20 and 22 and spacers 28 for the rear end of the unit. The facias and spacers add structural strength to the housing assembly and permit a thinner gauge metal, e.g. 0.059 inch, top and bottom, and 0.093 side panel members.

The side panel members 34 are then placed next to the spacers 28 positioned adjacent to the mounting columns 4, and the top and bottom panel members 38 and 40 are then placed in position so that their respective side rails 42 slip over and hold the side panel members 34. Finally the top and bottom panel members 38 and 40 are fastened to the mounting columns 4 by mechanical fasteners, in the specific embodiment shown here, by screws 45.

Referring now to FIG. 1, it is to be understood that the user of the electrical housing assembly unit which comprises the subject of this invention, may add a front panel 14, or a back panel 15 or both to the above specific embodiment, with such front or back panels or both, possibly containing various components such as control knobs 46 or gauges 48 without thereby limiting this invention in scope.

It is to be further understood that various modifications of the generic concepts of this invention are possible without departing from its spirit and accordingly the scope of the present invention should be determined solely from the following claims.

What is claimed is:

1. A housing assembly for electronic instruments and the like comprising:
    a plurality of mounting columns each having a main body portion having a U-shaped cross section and a lip portion protruding at a 90° angle from the main body portion, each end of the main body portion of the mounting column being closed by a cantilevered tab, a plurality of apertures being placed in the lip portion and in the main body portion for attachment of articles;

a top panel member having at least a pair of side rails extending therefrom;

a bottom panel member having at least a pair of side rails extending therefrom;

a pair of side panel members, the top and bottom panel members being connected by their respective side rails to respectively a side panel member and a mounting column, the pair of said rails extending from the top and bottom panel members respectively and further comprise a support member parallel to the side rails, whereby the support member provides additional structural strength to the side rails;

a plurality of spacers mounted between the mounting columns and the side panel members, the spacers having a planar side and another side having a ledge, the spacers being mounted between the side panel members and the mounting columns with the planar side of the spacer being adjacent to the mounting column and an edge of the side panel member resting in the ledge on the other side of the spacer, and the side panel member being flush with the spacer, and a plurality of facias mounted between the mounting columns and the top and bottom panel member, the facias having a ledge against which the top and bottom panel members respectively rest, with the outer surfaces of the top and bottom panel members respectively being flush with the facias wherein the facias have a portion protruding from the facias at a 90° angle against which the protruding portion of the main body portion of the mounting columns rest, wherein all the mounting columns have identical configurations, all the facias also have identical configurations and all the spacers have identical configurations to provide an economical housing assembly.

* * * * *